No. 626,975. Patented June 13, 1899.
E. A. CRUM.
GRAIN METER.
(Application filed Nov. 3, 1898.)
(No Model.) 2 Sheets—Sheet 1.
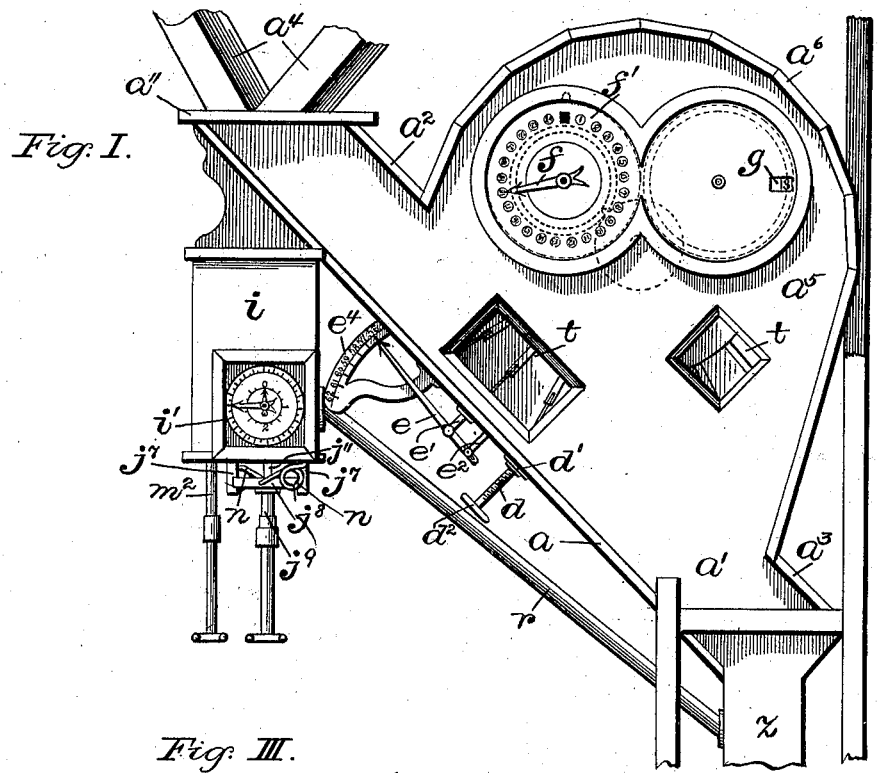
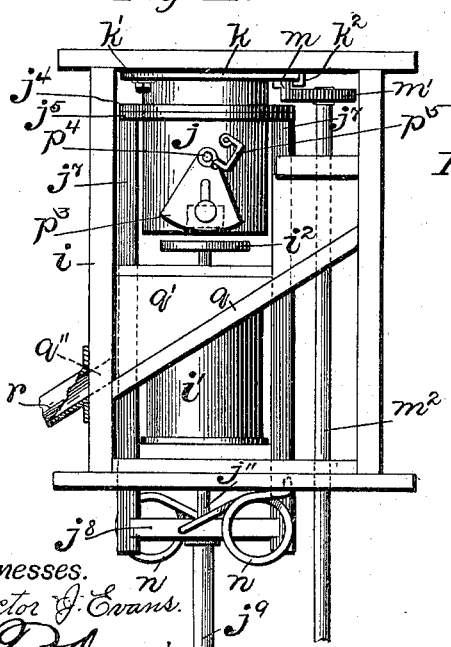
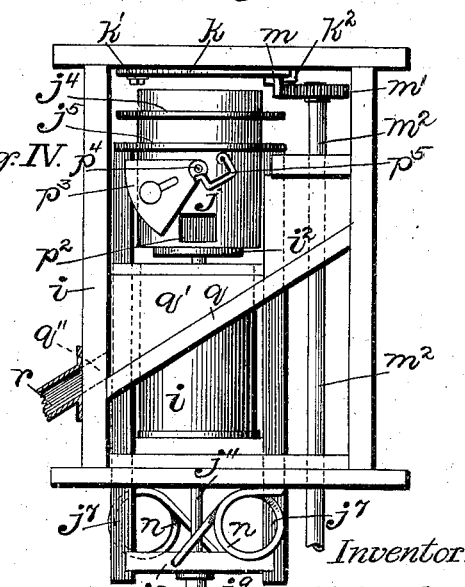
Witnesses.
Victor J. Evans.
F. Davis
Inventor.
Edward Adolph Crum
By Julian C. Dowell
His Attorney.

No. 626,975. Patented June 13, 1899.
E. A. CRUM.
GRAIN METER.
(Application filed Nov. 3, 1898.)
(No Model.)
2 Sheets—Sheet 2.
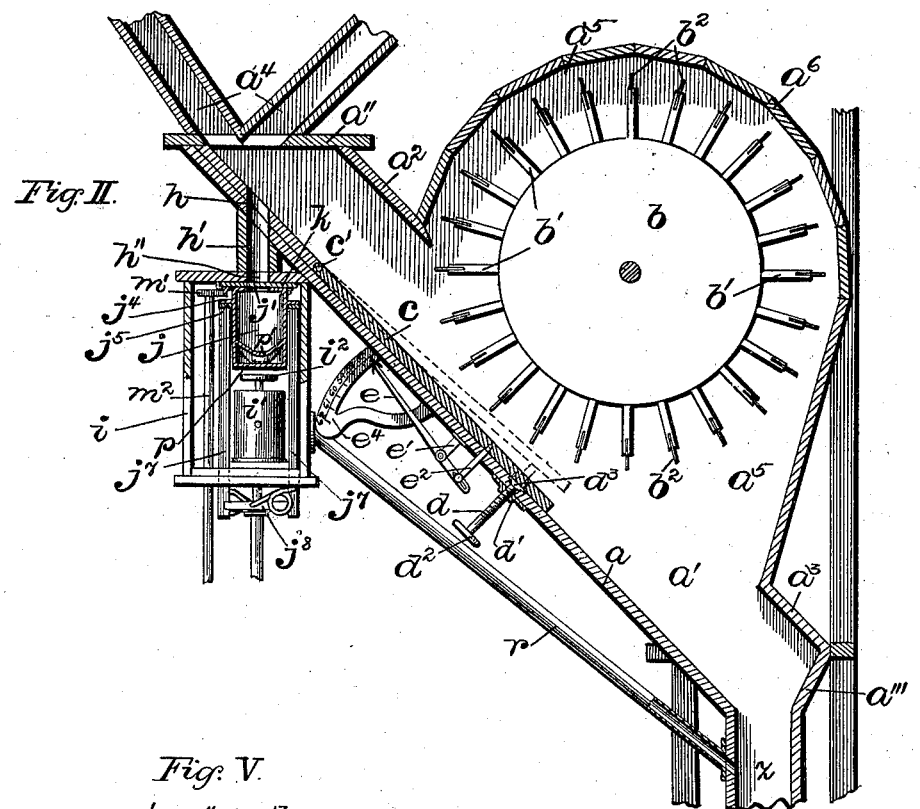
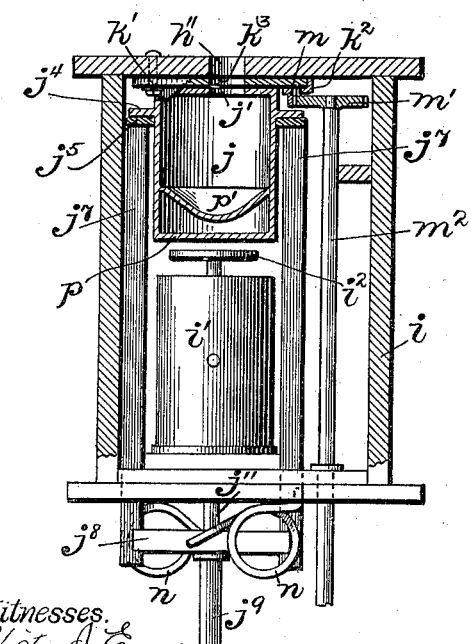
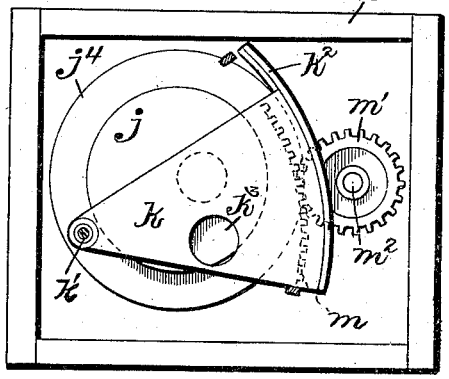
Witnesses.
Inventor
Edward Adolph Crum
By Julian A. Dowell
His Attorney

UNITED STATES PATENT OFFICE.

EDWARD ADOLPH CRUM, OF CLARKSVILLE, TENNESSEE, ASSIGNOR OF TWO-THIRDS TO JAMES LYLE GLENN, JR., AND JOHN MARTIN McDONNELL, OF SAME PLACE.

GRAIN-METER.

SPECIFICATION forming part of Letters Patent No. 626,975, dated June 13, 1899.

Application filed November 3, 1898. Serial No. 695,345. (No model.)

*To all whom it may concern:*

Be it known that I, EDWARD ADOLPH CRUM, a citizen of the United States, residing at Clarksville, in the county of Montgomery and State of Tennessee, have invented certain new and useful Improvements in Grain-Meters; and I do hereby declare the following to be a full, clear, and exact description of the invention, such as will enable others skilled in the art to which it appertains to make and use the same.

This invention relates to apparatus for automatically measuring dry commodities during delivery of the same from preparing machinery, and is more particularly intended to provide an improved construction of grain-meter whereby grain ready for delivery and moving in a compact column by its own weight can be accurately measured without impeding its progress, amounts being registered in bushels as the grain passes on the basis of a standard weight per bushel rather than by bulk, and provision being made for adjustment to different grades of grain according to their varying weights. A testing attachment is, moreover, employed to determine the exact weight of a given quantity of the commodity under treatment—as, for example, a bushel of wheat—so that the attendant may know how to adjust the meter to the grade of the material.

The drawings which accompany and form part of this specification illustrate a preferred form of embodiment of the invention specifically described hereinafter.

Figure 1 represents the complete apparatus in side elevation. Fig. 2 represents the same in vertical longitudinal section. Fig. 3 represents the testing apparatus in rear elevation. Fig. 4 is a similar view showing a different relation of parts. Fig. 5 is a cross-section of the testing apparatus under the adjustment shown in Fig. 3. Fig. 6 is a top plan view of the testing apparatus.

It is known that grain or a like commodity moving downwardly at an angle approximating forty-five degrees will travel at a practically uniform rate of speed while a full supply is kept up, and therefore in carrying out my invention I employ a chute arranged at such an angle and, as shown in the accompanying drawings, comprising a bottom $a$, sides $a'$, erected at right angles thereto, upper and lower end pieces $a''$ and $a'''$, and top or cover boards $a^2$ and $a^3$, extending comparatively short distances from said end pieces, respectively. Supply-chutes $a^4$ communicate with openings in the upper end piece of the above-described chute and are calculated to keep the same filled with its full complement of the commodity to be measured, which discharges through a somewhat-contracted opening into a vertical delivery-chute $z$ at the lower end of the angular or main chute. The sides $a'$ of the latter are formed with extensions or wings $a^5$, having rounded edges bridged by boards $a^6$, which, together with said sides, complete a casing for registering mechanism which comprises a drum $b$, journaled in said extensions of the chute sides and having a peripheral surface corresponding closely in width with the bottom $a$ of the inclined chute, the portion of such surface nearest the said chute-bottom occupying the plane of the top or upper side of the chute. The exact dimensions of the chute are of course ascertained and the area bounded by the bottom and sides of the latter and the nearest portion of the peripheral surface of the drum gives the basis of calculations for measuring the passing grain, which in moving through the throat bounded as above described imparts rotary motion to the drum, the latter being provided with a multitude of radial blades or paddles, each comprising standards $b'$, fastened in the drum and plates $b^2$, supported by the standards, so as to be presented to the full action of the passing grain in the chute. It will be seen that quite a number of the blades will always be embedded in the column of grain, and consequently the movement of the drum is steady and capable of giving accurate results in the measuring of grain gravitating down the chute.

It is intended that one complete revolution of the drum shall indicate a certain amount of the commodity being delivered—such, for example, as one bushel of wheat—and by multiplying the cubic inches represented by the area above defined, by the circumference of the drum, it can be ascertained how much of the commodity in cubic inches will pass through the throat during one revolution of the drum. Taking wheat for example, a standard bushel means sixty pounds in weight and 2,150.42 cubic inches in bulk, and if all wheat weighed and measured the same, the apparatus need only be proportioned to secure a certain area of opening between the bottom and sides of the chute and the peripheral surface of the drum, which area multiplied by the circumference of the drum would give the amount of cubic inches above designated; but as the weight of wheat to the measured bushel varies considerably it is desirable to provide for adjusting the area of the throat or opening above mentioned according to the grade of wheat under treatment, the heavier weight being caused to pass through a smaller area of throat than a lighter quality of wheat. Therefore the chute is provided with an adjustable bottom in the form of a board $c$, whose upper end is hinged or pivoted at $c'$ behind a shoulder of the chute-bottom proper, the said board extending well beyond the throat and being adjustable toward and from the drum by means of the following described devices: A screw $d$ works through a nut $d'$, fastened to the lower side of the bottom of the chute around an opening in the same, said screw having a knob or handle $d^2$ by which to manipulate it and being swiveled in a suitable socket $d^3$, secured to the under side of the board $c$, this construction providing for movement of the said board toward and from the drum by turning the knob $d^2$, as will be apparent. Of course it is important to know the exact area of the throat, and therefore an indicator is provided whereby to read such area, this indicator comprising an index-finger $e$, pivoted intermediate of its length to a standard $e'$, fastened to the under side of the chute-bottom, one arm of the said index-finger having a slot-and-pin connection, with an arm $e^2$ fastened to the board $c$ and extending loosely through an aperture in the chute-bottom, and the other arm of said index-finger working over an index-plate $e^4$, fastened to and outstanding from the chute-bottom and being suitably inscribed to indicate the different areas of openings or throats resulting from different adjustments of the board $c$.

The drum $b$ is geared to registering-wheels in any suitable or well-known manner, whereby each complete rotation of the drum will move an index-finger $f$ one step over the face of the dial $f'$, inscribed with a circular series of numbers indicating bushels, (a complete rotation of the index-finger $f$ indicating twenty-five bushels of wheat,) and whereby upon the completion of such rotation a transfer to a dial $g$ shall take place, such dial being caused to move one step. Openings are preferably provided in one side of the casing inclosing the registering mechanism, which openings are filled with panes of glass, as indicated at $t$ in Fig. 1, and afford a view of the interior mechanism, so that it can be told at a glance whether the same is working properly.

In connection with the fact above mentioned as to grades of material the necessity will at once become apparent for some convenient means whereby to ascertain the grade of material passing to the meter, and with this end in view I have provided a form of testing apparatus which I shall now describe. At a point some distance above the upper end of the hinged board $c$ an opening $h$ is made in the bottom of the chute, such opening being in alinement with a short passage-way $h'$ in communication with an opening $h''$ in the top of a casing $i$, which incloses weighing-scales $i'$ of any suitable form, the platform of the same being indicated by the letter $i^2$ and the said scales being contained in the lower part of the casing. A receptacle $j$, having a known capacity, is arranged above said scales and its top is formed with an opening $j'$, alining with the opening $h''$, but normally cut off from communication therewith by a plate $k$ interposed between the top of the receptacle $j$ and the top of the casing $i$, such plate being of segmental form, as shown more clearly in Fig. 6, and being pivoted at its narrow end, as shown at $k'$, to the casing-top, its wide end being held closely against the latter by a guide-flange $k^2$. This cut-off plate is formed with a circular opening $k^3$, adapted under one adjustment of the plate to register with the openings $j$ and $h''$, and the said plate has a segment-gear $m$ fastened to its under side, which gear is in mesh with a pinion $m'$, affixed to the upper end of a shaft $m^2$, which extends down through the bottom of the casing and is suitably equipped for manipulation, whereby communication between the receptacle and the chute is controlled. The receptacle is formed with an outstanding annular flange $j^4$ near its top and is normally held up against the cut-off plate by an encircling collar $j^5$, upon which the said flange rests, this collar being mounted on the upper ends of a pair of sliding bars or rods $j^7$, which extend down through the bottom of the casing and are united by a cross-bar $j^8$. A pair of coiled springs $n$, fastened to the said cross-bar and to the bottom of the casing, exert themselves to hold the frame $j^5 j^7 j^8$ elevated, and consequently press the receptacle against the cut-off plate and keep it elevated above the platform of the scales, as shown in Figs. 2, 3, and 5. A hollow rod $j^9$ is fastened to the cross-bar $j^8$ and loosely surrounds a guide-rod $j^{11}$, affixed to the casing, said hollow rod being suitably equipped for manipulation, so that by pulling down upon the same the receptacle $j$ may be permitted to lower and rest with its flat bottom $p$ upon the platform of the scales. The receptacle is, however, formed with a false bottom $p'$, which slopes from all directions toward the lower side of an outlet-opening $p^2$ in the rear side of the receptacle, which outlet-opening is normally closed by a segmental plate $p^3$, pivoted at $p^4$ to the side of the receptacle and weighted to cause it to maintain its closing position in the absence of the application of force to displace it. Said closing-plate has an angular arm $p^5$ affixed to it near the pivot and extending upwardly beyond the latter, where it has a rounded end for the collar $j^5$ to abut when lowered beyond a position where it leaves the receptacle free. In operating this testing apparatus the cut-off plate, which normally closes communication between the chute and the receptacle $j$, is moved by turning the rod $m^2$ so as to bring its opening $k^3$ in alinement with the passage-way leading from the chute, and thereupon the grain flows into the receptacle and fills the same, after which the cut-off plate is restored to its normal position, and then the rod $j^9$ is drawn down until the receptacle rests freely upon the platform of the scales, when the weight of its contents will be indicated on the face of the latter. Now by further drawing down the rod $j^9$ the collar $j^5$ will be caused to encounter the rounded end of the arm $p^5$, and the continued downward movement of the collar will displace the plate $j^3$, so that the opening $p^2$ will be uncovered and the contents of the receptacle allowed to escape. To avoid wasting this measured and weighed quantity of grain, a slideway is constructed in the back part of the casing of the testing apparatus to receive grain issuing through the opening $p^2$, such slideway comprising the rear side of the casing, a board $q'$ behind the scales, and an inclined strip $q$, extending from side to side of the casing, with its upper surface flush with the lower side of an opening $q''$ in one side of the casing, through which opening the grain passes into a pipe $r$, leading to the delivery-chute $z$.

Means may be provided, if found desirable, for locking the rods $m^2$ and $j^9$ in their different positions, and as the testing apparatus will ordinarily be located at a considerable elevation it may be desirable to provide a special device of elongated form to constitute a detachable handle for working the said rods and also for working the screw $d$ to adjust the movable bottom of the chute.

Having thus fully described my invention, what I claim as new, and desire to secure by Letters Patent of the United States, is—

1. In an apparatus of the character described, the combination of an inclined chute, a registering paddle-wheel working in the middle portion of said chute, a measuring-receptacle having a top opening for communication with the upper part of the chute, a cut-off device controlling such communication, weighing-scales arranged to receive said receptacle, means for supporting the latter free of the scales, said means manipulative to permit the receptacle to rest upon the scales, and a supplemental chute or conduit for returning the weighed contents of the receptacle to the main-chute outlet, substantially as described.

2. In an apparatus of the character described, the combination of an inclined inclosed chute, a wheel arranged above the same and having a peripheral surface which extends from side to side of said chute and corresponds in width with the bottom thereof which it confronts, said wheel having a series of radially-projecting blades adapted to successively enter the chute under rotation of the wheel, and registering mechanism operatively connected with said wheel whereby amount of grain gravitating down the chute can be ascertained by cubic inches determined by the area of opening bounded by the bottom and sides of the chute and the peripheral surface of the wheel, together with a bottom piece in the chute confronting the peripheral portion thereof nearest the inclined chute-bottom, and adjustable toward and from the wheel to vary the said area of opening.

3. In an apparatus of the character described, the combination of an inclined inclosed chute, a wheel arranged above the same and having a peripheral surface which extends from side to side of said chute and corresponds in width with the bottom thereof which it confronts, said wheel having a series of radially-projecting blades adapted to successively enter the chute under rotation of the wheel, and registering mechanism operatively connected with said wheel whereby amount of grain gravitating down the chute can be ascertained by cubic inches determined by the area of opening bounded by the bottom and sides of the chute and the peripheral surface of the wheel, together with a bottom piece in the chute confronting the peripheral portion thereof nearest the inclined chute-bottom, and hinged beyond the confronting line, and means for adjusting the said bottom piece on its hinge to vary the said area of opening.

4. In an apparatus of the character described, the combination of an inclined inclosed chute, a wheel arranged above the same and having a peripheral surface which extends from side to side of said chute and corresponds in width with the bottom thereof which it confronts, said wheel having a series of radially-projecting blades adapted to successively enter the chute under rotation of the wheel, and registering mechanism operatively connected with said wheel whereby amount of grain gravitating down the chute can be ascertained by cubic inches determined by the area of opening bounded by the bottom and sides of the chute and the peripheral surface of the wheel, together with a bottom piece in the chute confronting the peripheral portion thereof nearest the inclined chute-bottom, and hinged beyond the confronting line, means for adjusting the said bottom piece on its hinge to vary the said area of opening, and an indicator to determine the amount of adjustment.

5. A tester for use in conjunction with grain-meters or like apparatus, the same comprising a receptacle for a charge of grain having a top inlet-opening, a cut-off device for the latter, weighing-scales below the receptacle, and a vertically-movable spring-sustained support for said receptacle normally holding the same free from the platform of the scales, downward movement of the support permitting the receptacle to rest upon the said platform, substantially as described.

6. A tester for use in conjunction with grain-meters or like apparatus, the same comprising a receptacle for a charge of grain having an inlet-opening at the top and an outlet-opening in one side at the bottom, a cut-off device for said supply-opening, a closure for the outlet-opening normally covering the same, weighing-scales below the receptacle, and a vertically-movable support for said receptacle normally holding the same free from the platform of the scale, said support being downwardly movable to permit the receptacle to lodge on such platform, and having provision for displacing the outlet-closure.

7. A tester for use in conjunction with grain-meters or like apparatus, the same comprising a receptacle for a charge of grain having an inlet-opening at the top and an outlet-opening in one side at the bottom, a cut-off device for said supply-opening, a hinged and weighted closure for the outlet-opening normally covering the same, weighing-scales below the receptacle, and a vertically-movable support for said receptacle normally holding the same free from the platform of the scales, said support being downwardly movable to permit the receptacle to lodge on such platform, and having provision for displacing the outlet-closure.

8. In a testing apparatus for use in conjunction with grain-meters or like apparatus, the combination of a receptacle of known capacity having an inlet-opening at the top and an outlet-opening at the bottom, a cut-off device for the supply-opening, a hinged and weighted closure for the outlet-opening normally closing the same and having an upward-projecting arm beyond the hinge or pivot, a spring-supported annulus sustaining the receptacle and depressible to permit lowering of the same and also coaction with the arm of the weighted closure to displace the latter, and a weighing-scale below the receptacle, substantially as described.

9. In an apparatus of the character described, the combination of an inclined chute with an opening in its lower side, a measuring-receptacle arranged below said opening, a cut-off device controlling the latter, weighing-scales, means for supporting the receptacle manipulative to permit the same to rest on the scale, a registering paddle-wheel working in the chute below the opening, and an adjustable bottom piece in the chute opposite said wheel.

10. In a tester for use in conjunction with grain-meters or like structures, the combination of weighing-scales, a receptacle located above the platform or holder thereof and having an external flange, and a lifting-frame comprising a collar engaging the under side of said flange and bars extending downwardly from said collar and alongside the receptacle and the scale, said frame being suitably equipped at its lower part for manipulation, substantially as described.

In testimony whereof I affix my signature in presence of two witnesses.

EDWARD ADOLPH CRUM.

Witnesses:
C. B. LYLE,
A. R. GHOLSON.